(12) United States Patent
Stork

(10) Patent No.: US 6,622,767 B2
(45) Date of Patent: Sep. 23, 2003

(54) MULTI-STAGE SHRINK-WRAP SEALING AND CUTTING APPARATUS

(75) Inventor: Brian R. Stork, Washington, MO (US)

(73) Assignee: Stork Fabricators, Inc., Washington, MO (US)

(*) Notice: Subject to any disclaimer, the term of this patent is extended or adjusted under 35 U.S.C. 154(b) by 0 days.

(21) Appl. No.: 10/077,127

(22) Filed: Feb. 15, 2002

(65) Prior Publication Data

US 2002/0148569 A1 Oct. 17, 2002

Related U.S. Application Data

(60) Provisional application No. 60/269,320, filed on Feb. 16, 2001.

(51) Int. Cl.[7] .............................................. B30B 15/34
(52) U.S. Cl. ..................... 156/522; 156/555; 156/582; 156/583.1; 53/450; 53/477; 53/555
(58) Field of Search ................................ 156/510, 522, 156/553, 555, 580, 581, 582, 583.1; 53/442, 450, 477, 550, 557

(56) References Cited

U.S. PATENT DOCUMENTS

| | | | |
|---|---|---|---|
| 5,183,527 A | * 2/1993 | Parker | 156/555 |
| 5,237,800 A | 8/1993 | Omori | 53/433 |
| 5,337,542 A | 8/1994 | Omori | 53/550 |
| 5,417,041 A | 5/1995 | Hansen et al. | 53/550 |
| 5,540,806 A | * 7/1996 | Traise | 156/555 |
| 6,131,636 A | * 10/2000 | Anderson et al. | 156/555 |
| 6,213,183 B1 | * 4/2001 | Kerr et al. | 156/358 |
| 6,435,247 B1 | * 8/2002 | Kerr | 156/555 |

* cited by examiner

Primary Examiner—James Sells
(74) Attorney, Agent, or Firm—Peter S. Gilster; Greensfelder, Hemker & Gale, P.C.

(57) ABSTRACT

An improved film sealing and cutting apparatus (10) for use with a shrink-wrap machine that individually wraps articles (219) sequentially with shrink-wrap film material (200) of different possible thickness and composition, especially thick, tough film which would be difficult to seal. The apparatus (10) includes two pairs of selectively heated rollers (97, 98). Overlapping layers (209) of film material wrapped around an article are passed between peripheral surfaces of each roller pair. The first roller pair forms a thermal conditioning pre-seal (208) between opposing surfaces of the overlapping layers by application of heat and pressure along the peripheral surfaces of the first roller pair. The second roller pair then completes the seal and cuts through the opposing surfaces, leaving a margin between a cutting path formed by the peripheral surfaces of the second roller pair and the seal.

29 Claims, 10 Drawing Sheets

MULTI-STAGE SHRINK-WRAP SEALING AND CUTTING APPARATUS

CROSS-REFERENCE TO RELATED APPLICATIONS

This application is based upon Provisional Patent Application, Ser. No. 60/269,320, entitled "Multi-Stage Shrink-Wrap Sealing And Cutting Apparatus", filed Feb. 16, 2001, the contents of which are incorporated herein by reference in their entirety; and continued preservation of which is requested.

BACKGROUND OF THE INVENTION

The invention relates to apparatus for sealing and cutting shrink-wrap film material for use with a shrink-wrap machine for individually wrapping articles and, more particularly, to a multi-stage shrink-wrap sealing and cutting apparatus for use with a shrink-wrap machine.

Shrink-wrap machines for packaging articles with shrink-wrap film material generally include a loading station at which articles are sequentially loaded onto the machine, and propelled by a conveyor through a wrapping station which wraps articles sequentially with shrink-wrap film material from a film supply. The conveyor carries articles wrapped in the film material to a film sealing and cutting station, the design of which may vary with the desired type of seal that is to be applied. For example, if film is folded around the periphery of an article, and the opposing edges of the film material overlap and extend to one side of the article, one commonly used seal is a side seal. In producing a side seal, opposing surfaces of the film material are bonded together by application of heat and pressure along the peripheral surfaces of a single roller pair situated on opposing sides of the film material as the film-wrapped articles are sequentially passed along that portion of the machine. Due to the geometry of the roller pair, which comprises two adjacent circular rollers, the heat and pressure applied to opposing sides of the film material occurs only at the relative point of tangency between the peripheral surfaces of the roller pair. The term "relative point of tangency" is used because, of course, the film material passes between the peripheral surfaces of the roller pair.

In addition to forming a seal along the opposing surfaces of film material, it is generally desirable to trim as much excess overlapping film from the package to be formed. A package refers to the film-wrapped article that has been completely processed by the shrink-wrap machine and is ready for retail sale. Conventionally, both the sealing and trimming operations have been performed by the same single pair of rollers. This may be accomplished by one roller having a peripheral surface which includes opposing beveled edges which form a cutting edge that extends along the peripheral surface. The other roller may have a substantially flat peripheral surface, but be comprised of a somewhat resilient material, such as a hard rubber, to more conformally receive the cutting edge of the other roller.

In operation, the film material passes between the opposing surfaces of the roller pair. At the relative point of tangency between the peripheral surfaces of the opposing roller pairs, the cutting surface cuts through the film material. Simultaneously, as the film material is being cut, a seal is formed along the edge of the film material adjacent the cut line by the combined heat and pressure between the peripheral surface of the inside beveled edge of one roller and the flat peripheral surface of the other roller.

After this combined trim seal and cutting operation are performed, the film-wrapped articles are further carried along the shrink-wrap machine. Subsequently, a cutting and sealing operation places a transverse seal between adjacent articles thus creating individually wrapped film-wrapped articles. Finally, the film-wrapped articles are processed through a heating station which causes the shrink-wrap material to shrink with respect to the articles, at which point the film-wrapped articles become packages.

Machines of this character are generally operated at high-speed, to maximize their efficiency. Therefore, the highest operational speed the machine can attain is limited by the operation which takes the machine the most time to perform. The availability of newer shrink-wrap materials are playing a more critical role in such efficiency considerations.

A class of very strong new heat-sealable film materials (referred to herein as the "tough film materials" or the "new tough film materials"), such a Cryovac® CorTuff™ made by Sealed Air Corporation, is being increasingly used in industry to wrap articles. Packages of such tough film materials are extremely strong and tough, providing very high impact and cutting protection. They are strong enough and sufficiently protective that they can function as primary shipping containers without more, and may be used as an alternative to corrugated boxes. Use of such materials provides substantial savings and packaging and shipping cost reductions. However, these new tough film materials are far more difficult to cut and seal than conventional shrink-wrap film materials.

Conventional cutting and sealing apparatus previously described which both form and cut film material, as by using a single roller pair, may only be able to operate at 40 percent or even less of its maximum operating speed previously attainable with conventional shrink-wrap film materials, if at all. These tough film materials require additional heat to form a seal of acceptable strength between opposing surfaces of shrink-wrap film material. Due to such need for increased heat, a single roller pair design is no longer sufficient, especially if higher operating speeds are required, as there are limits to the amount of thermal energy that can be effectively conducted to film material at a single tangential region of contact between heated and pressurized surface peripheries associated with a single roller pair. However, the use of multiple stages which may comprise at least one set of roller pairs selectably heated to establish a side seal, followed by at least one set of rollers to cut the film material, permits these higher operating speeds to be attained. An analogy may be found in rocket boosters, where a main booster rocket is required to put a payload into a speed and/or altitude from which the payload rocket can proceed at high speed to ultimate trajectory. It is accordingly desired that multiple stages of roller pairs be provided for a film sealing and cutting apparatus that are selectively heatable to permit high-speed operation of a shrink-wrap machine.

SUMMARY OF THE INVENTION

Among the several objects, features and advantages of the present invention may be noted an improved film sealing and cutting apparatus for use with a shrink-wrap machine for individually wrapping articles which:

achieves extremely high-speed and throughput;

achieves such wrapping when using tough film materials;

can be used for wrapping products when using difficultly sealable film materials such a Cryovac® CorTuff™;

requires less film overlap around articles to be wrapped, thereby reducing material costs;

permits independent vertical adjustment of the roller pairs;

permits ease of separation between an opposing pair of guide chains;

permits the use of different thicknesses and composition of shrink-wrap film materials.

Briefly, according to a first embodiment, the present invention relates to an improved film sealing and cutting apparatus for use with a shrink-wrap machine for individually wrapping articles sequentially with shrink-wrap film material of different possible thickness and composition, and most especially new tough film materials heretofore applied with difficulty or slow throughput. The shrink-wrap machine includes a wrapping station at which articles are first wrapped with shrink-wrap film material from a film supply so that opposing edges of the film material overlap and extend to one side along the articles, but the film material is not yet sealed. A conveyor carries articles wrapped in the film material from the wrapping station to a film sealing and cutting station at which the film material is sealed and cut along one side of the articles as they move with respect to the film sealing and cutting station. According to this first embodiment, the new film sealing and cutting apparatus comprises at least a first and second pair of rollers. The first pair of rollers is in opposition to present peripheral surfaces of the rollers of the first pair in opposition for forming a seal between opposing surfaces of the film material along longitudinal edges thereof between the rollers of the first pair. A pressure-producing structure urges the rollers of the first pair in opposition toward each other. A heater causes heating of at least one of the rollers of the first pair, to form by heat and pressure between the peripheral surfaces of the rollers of the first pair. A longitudinal seal is thus produced by the first pair of rollers along a side of each article, as film-wrapped articles pass by the first pair of rollers. The second pair of rollers are in opposition in proximity to the first pair of rollers for engagement of the film material proximate the seal after formation thereof. At least one of the rollers of the second pair has a cutting periphery. Pressure-producing structure urges the rollers of the second pair in opposition toward each other, so as to cut by pressure applied to peripheral surfaces of the second pair of rollers through opposing surfaces of the sealed film material along the film material, and so leaving a margin between a cutting path formed by the peripheral surfaces of the second pair of rollers and the inside edge of the seal.

According to a second embodiment particularly beneficial in the sealing of the new tough film materials, the new film sealing and cutting apparatus includes two pairs of selectively heated rollers. Overlapping layers of film material wrapped around an article are passed on one side of the article between peripheral surfaces of each roller pair. The first roller pair forms a thermal conditioning pre-seal between opposing surfaces of the overlapping layers by application of heat and pressure along the peripheral surfaces of the first roller pair. The second roller pair then completes the seal and cuts through the opposing surfaces, leaving a margin between a cutting path formed by the peripheral surfaces of the second roller pair and the seal. Pressure-producing structure urges the respective roller pairs in opposition toward each other.

Other objects, features and advantages will be in part apparent and in part pointed hereinbelow.

BRIEF DESCRIPTION OF DRAWINGS

Corresponding reference characters identify corresponding elements throughout the several views of the drawings.

DESCRIPTION OF PRACTICAL EMBODIMENTS

Figure 1:
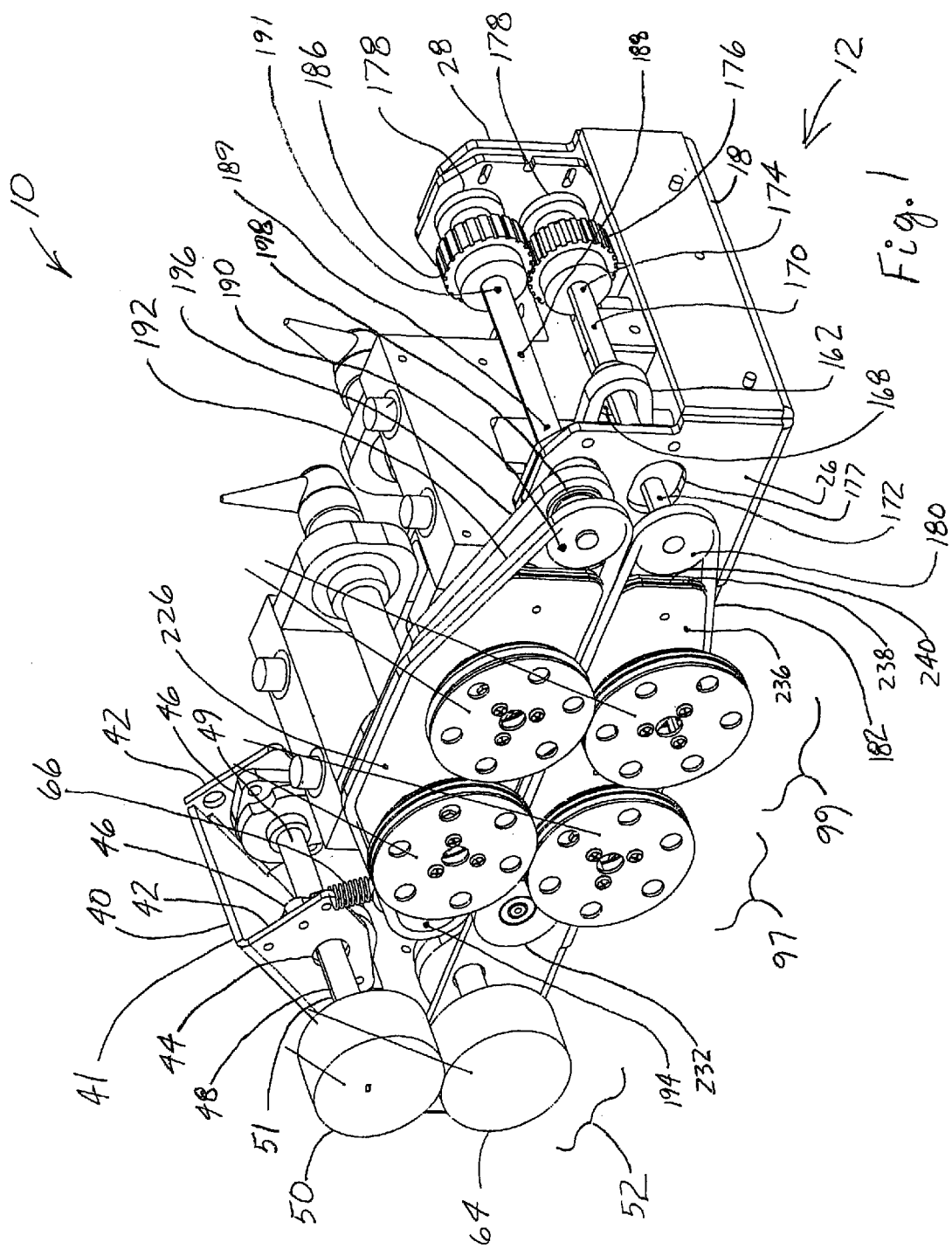
FIG. 1 is a perspective view of apparatus for sealing and cutting thermalplastic film, in accordance with and embodying of the present invention.

Referring to the drawings, the new cutting and sealing apparatus is generally indicated at 10 in FIG. 1. Referring to FIGS. 1 and 7–9, cutting and sealing apparatus 10 comprises a body 12 which carries a pulling device 52 that pulls sequentially positioned articles 219 wrapped in film material 200, also referred to as shrink-wrap film material, along apparatus 10. Receiving film material 200 from pulling device 52, a first roller pair 97 engages film material 200 from opposing sides, and forms a seal 208 between opposing surfaces 205. After receiving film material 200 from adjacent first roller pair 97, a second roller pair 99 cuts and may selectively form, at an operator's option, an additional trim seal 210 along the new edge established by second roller pair 99.

Figure 2:
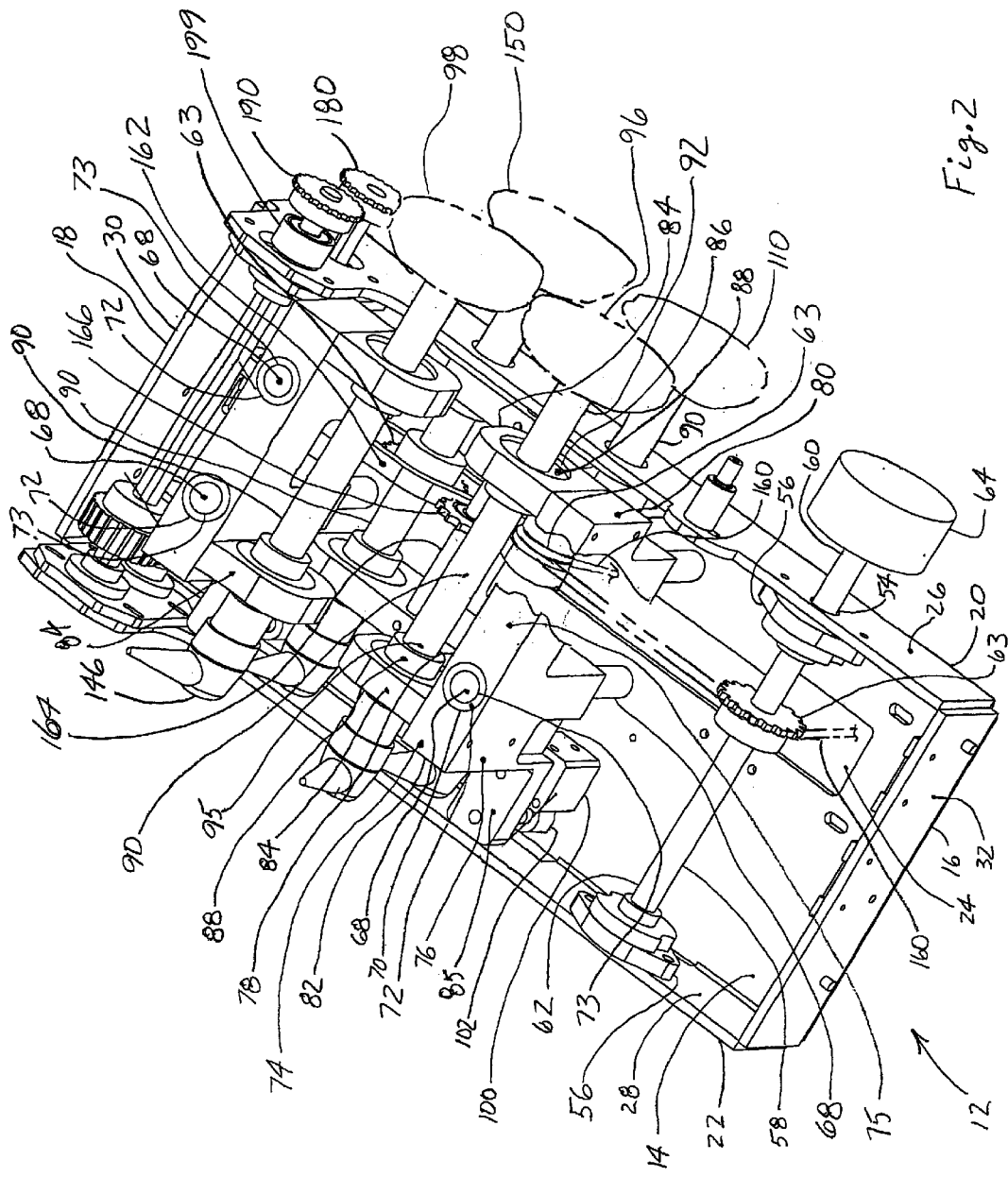
FIG. 2 is a reversed perspective view with certain elements removed for clarity.

Referring to FIGS. 1 and 2, body 12 comprises a box structure comprising a substantially rectangular bottom plate 14 including a forward end 16 and a parallel aft end 18. Interposed between forward end 16 and aft end 18 are opposing longitudinal proximal end and distal end 20 and 22. Formed in bottom plate 14 is a longitudinal slot 24 through which a first drive chain 160 passes that meshes with gearing in cutting and sealing apparatus 10 for propelling apparatus 10 as will be discussed in greater detail below. Securely connected to proximal end 20 is a proximal plate 26 which extends upwardly in a perpendicular direction therefrom. Likewise, securely connected along distal end 22 is a distal plate 28 which is parallel to proximal plate 26. Interposed between proximal plate 26 and distal plate 28 are aft and forward plates 30 and 32.

Figure 3:
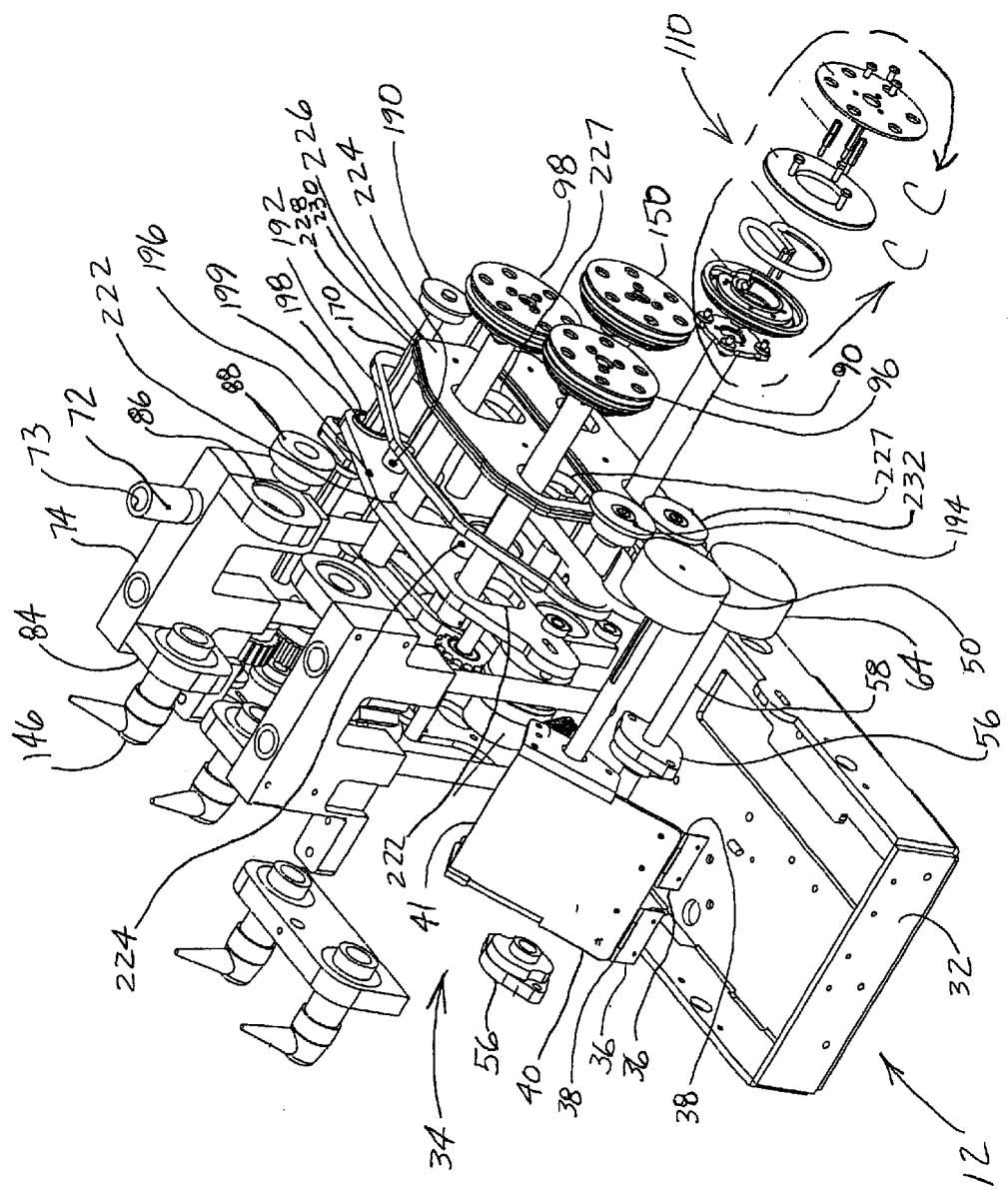
FIG. 3 is an exploded perspective view of the apparatus.

Referring to FIGS. 1 and 3, hinged support 34 is now discussed. Hinged support 34 comprises a pair of hinge plates 36 which are securely connected to forward plate 32. Hinge plates 36 are preferably connected to support member 40 by a pair of hinge pins 38 which permits support member 40 to rotate about the axis of hinge pins 38 with respect to body 12. Referring back to FIG. 1, support member 40 further includes a plate 41 having pair of opposed parallel flanges 42 extending therefrom, forming a "C-shaped" structure. Formed in flanges 42 are a pair of transversely aligned apertures 44 which are additionally aligned with a pair of flanged bushings 46 for receiving a shaft 48 having a distal end 49 and proximal end 51. Securely attached to proximal end 51 is an upper roller 50 which forms part of pulling device 52.

Referring to FIGS. 2 and 3, a lower roller 64 which comprises the lower portion of pulling device 52 is now discussed. Lower roller 64 is securely connected to proximal end 60 of shaft 58 which further includes a distal end 62. Shaft 58 is carried by flanged bearings 56 which are securely connected to proximal plate 26 and distal plate 28, respectively. Aligned with flanged bearings 56 are apertures 54 formed in proximal plate 26 and distal plate 28. Distal end 22 of shaft 58 is directed through aperture 54 and into engagement with flange bearing 56. Interposed between distal end 62 and proximal end 60 is a gear 63 securely connected to shaft 58 which is engaged with and driven in rotational motion about shaft 58 by a first drive chain 160. First drive chain 160 is externally driven by the shrink-wrap machine. Additionally, first drive chain 160 engages gear 63 which is securely connected to a hollow shaft 90 that is securely connected to a lower first roller 110. Referring back to FIG. 1, upper roller 50 and lower roller 64 collectively comprise pulling device 52 for pulling and directing film material 200 toward adjacent first roller pair 97 and subsequently toward adjacent second roller pair 99 as will be discussed in greater detail below. Maintaining a force urging upper roller 50 toward lower roller 64 is a spring 66 which is preferably connected to flange 42 for urging support member 40 to pivot about the axis defined by hinge pin 38 toward bottom plate 14 of body 12.

Referring to FIG. 2, a vertical stroke block 74 permits selective vertical separation between an upper first roller 96 and lower first roller 110 of first roller pair 97, and between an upper second roller 98 and a lower second roller 150 of second roller pair 99 as will be discussed in greater detail below. Vertical stroke block 74 includes forward and aft surfaces 76 and 78 for secure attachment with horizontal extending longitudinal flanges 84. Additionally, vertical stroke block 74 additionally includes a proximal surface 80 and distal surface 82. Extending outwardly from vertical stroke block 74 in a transverse direction is flange 85 for engaging an air cylinder 100, also referred to as a pressure-producing device which includes any of a group of mechanical, electrical, hydraulic or pneumatic devices that similarly operate. Further, vertical stroke block 74 has a top surface 75 through which are formed apertures 70 in which are inserted bushings 72 for providing high tolerance apertures 73 which are slidably engagable with posts 68. Posts 68 which extend vertically from bottom plate 14 thereby limit the movement of vertical stroke block 74 to a vertical direction only. Flange 85 is carried by air cylinder 100 which controls vertical movement along posts 68. To prevent damage to cutting and sealing apparatus 10 components when air cylinder 100 drives flange 85 forcefully downward against its bottom stop, shock absorber 102 is provided between each flange 85 and bottom plate 14.

Referring to FIGS. 2 and 3, flange 84 is now further discussed. Flange 84, which may extend from either forward surface 76 or aft surface 78 in a longitudinal direction depending upon its use, are utilized in pairs through which transversely aligned apertures 86 are formed therethrough. Fitted into each aperture 86 is bearing 88. Rotatably carried in each pair of bearings 88 is hollow shaft 90 which includes a distal end 95 and a proximal end 92. Each of the following rollers is securely connected to each proximal end 92: upper first roller 96, upper second roller 98, lower first roller 110 and lower second roller 150. In normal operation, air cylinder 100 which is securely connected to flange 85 drives vertical stroke block 74 in a downward vertical direction along posts 68. This downward vertical movement drives upper first roller 96 vertically downward toward lower first roller 110 and upper second roller 98 vertically downward toward lower second roller 150 for compressively engaging film material 200 between the opposing peripheral surfaces of these rollers. Alternatively, if air cylinder 100 drives vertical stroke block 74 in an upward vertical direction along posts 68, upper first roller 96 is driven vertically in a direction away from lower first roller 110 and upper second roller 98 is likewise driven in an upward vertical direction away from lower second roller 150. Such separation between respective upper and lower rollers is to prevent damage to film material 200 when the machine has stopped conveying articles 219 along the machine. Because at least one of the pairs of rollers is heated as will be discussed in further detail below, not separating the upper rollers from the lower rollers would likely result in "melt-through" of film material 200.

Figure 4:
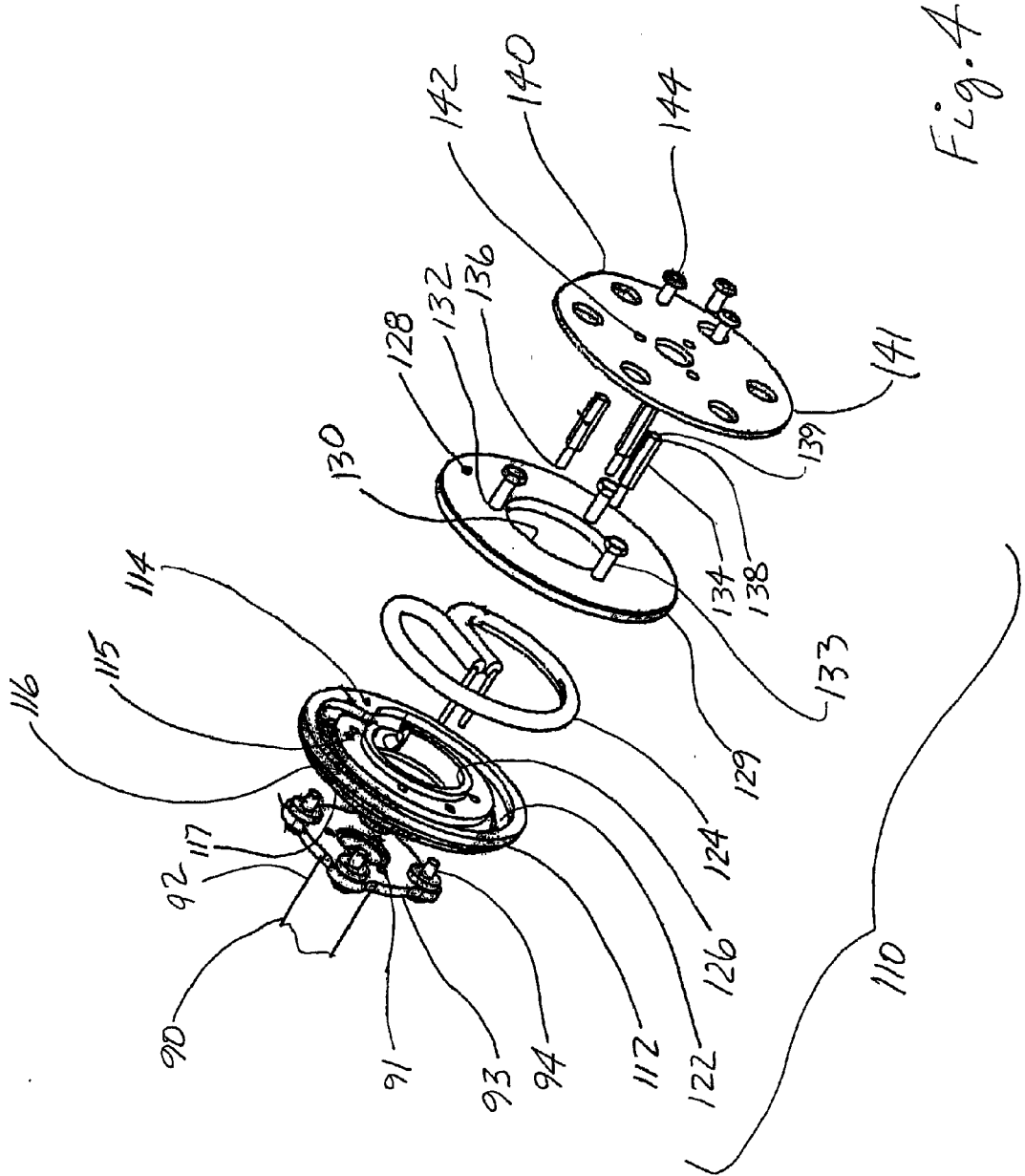
FIG. 4 is an enlarged exploded perspective view of a roller from FIG. 3.
Figure 8:
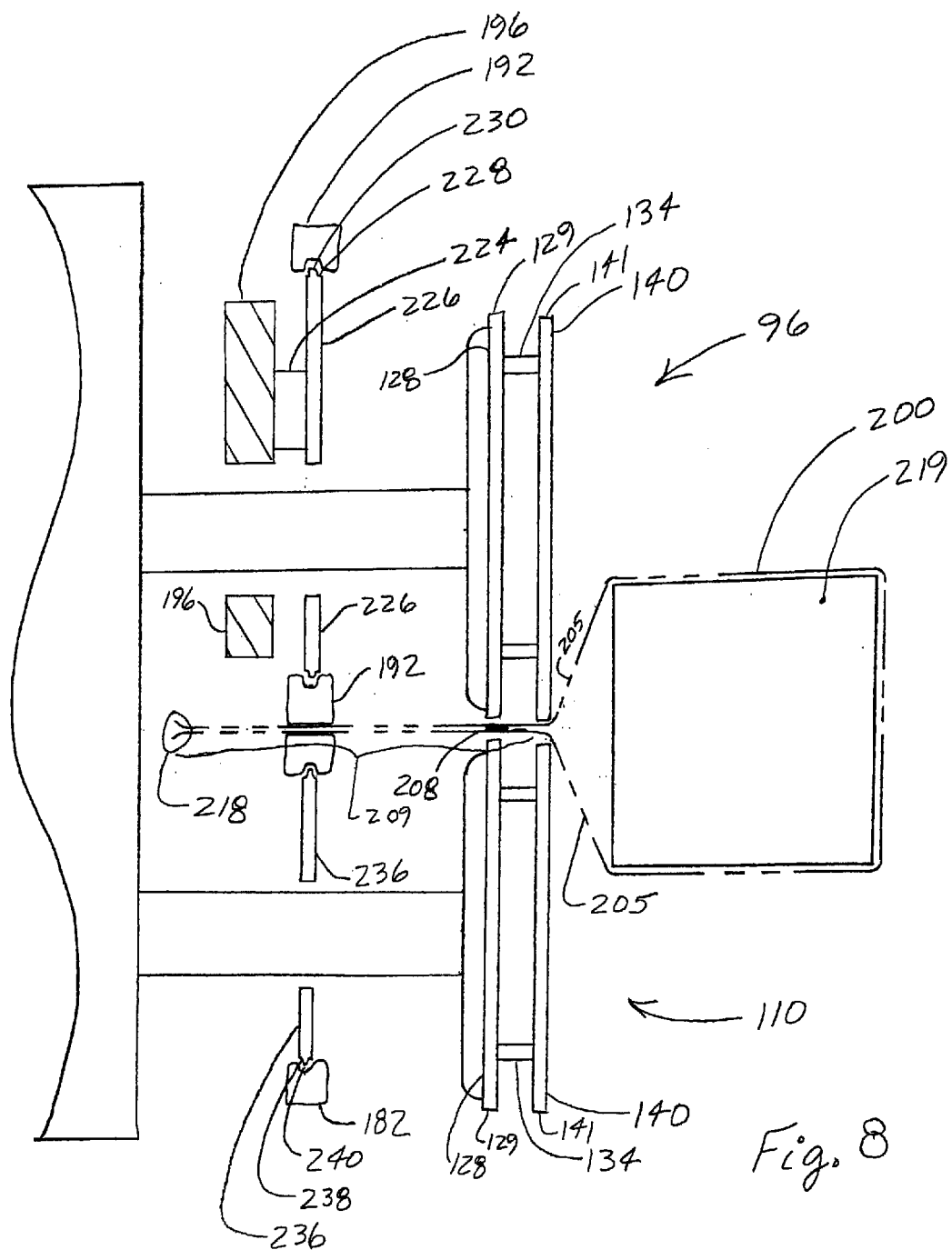
FIG. 8 is a cross-sectional view taken along line B—B of FIG. 7.

Referring to FIGS. 2–4, lower first roller 110 shall now be discussed. Lower first roller 110 acts in opposing rotational motion with upper first roller 96 to form a longitudinal seal between overlapping surfaces 209 as will be described in greater detail below. Lower first roller 110 is securely connected to proximal end 92 of hollow shaft 90. Referring specifically to FIG. 4, proximal end 92 is securely connected to a flanged portion 93 through which are formed a plurality, preferably 3, of threaded apertures 91 for receiving a plurality of standoff screws 134. Extending from flanged portion 93 transversely in a direction away from hollow shaft 90 is a plurality of pins 94, preferably 4, for securing a cylinder roller member 112. Securely engaged by pins 94 through corresponding apertures 117 in a distal surface 116, cylindrical roller member 112 includes a proximal surface 114, a recessed region 122 formed into proximal surface 114 for securing a heating element 124, also referred to as a heater, and an annular lip 126 extending from proximal surface 114 for securing sealing ring 128. Cylindrical roller member 112 further includes a plurality of threaded apertures 115 with which to assemble the other components of lower first roller 110. Heating element 124 of known construction is interposed between roller member 112 and sealing ring 128 providing heat in the form of electrical resistance. Conductors (not shown) convey electrical current through hollow shaft 90 connecting with a commutator 146 (FIG. 2) which permits the operator to selectively heat any one of the rollers of the two roller pairs. Thermal energy which emanates from heating element 124 is conveyed to peripheral surface 129 of sealing ring 128 by conduction. Preferably, the temperature maintained at peripheral surface 129 can vary from room temperature to at least 400° F. Once heating element 124 is installed in recessed region 122, sealing ring 128 is fitted onto roller member 112 with an aperture 130 of sealing ring 128 sliding over annular lip 126. Securely connecting sealing ring 128 to cylindrical roller member 112 are a plurality of mechanical fasteners 133 which engage threaded apertures 115 in cylindrical roller member 112 through aligning apertures 132 in sealing ring 128. As is shown, distal end 136 of standoff screw 134 is engaged with threaded apertures 91 in flange portion 93. Standoff screws 134 further include a proximal end 138 further containing threaded apertures 139 which align with corresponding apertures 142 in lower film clamp 140. Lower film clamp 140 is essentially a disk of identical diameter as sealing ring 128 in coaxial rotation with sealing ring 128, and is used to bring together opposing surfaces 205 of film material 200 along peripheral surface 141 which produces an improved seal (FIG. 8). Conventionally, guide chains have been utilized in the art to perform this function, and cannot be maintained in as close proximity as can film clamps 140 of the present invention. Because of this close proximity between sealing ring 128 and film clamp 140 that is maintained by standoff screws 134 which abut lower film clamp 140 along proximal end 138, film-wrapped articles 219 may be conveyed at a lesser distance than previously possible, thereby requiring less overlap of film material 200, thereby producing a cost savings. Securing lower film clamp 140 to proximal end 138 of standoff screws 140, are screws 144 which threadedly engage threaded apertures 139 therein through apertures 142 in lower film clamp 140.

Figure 9:
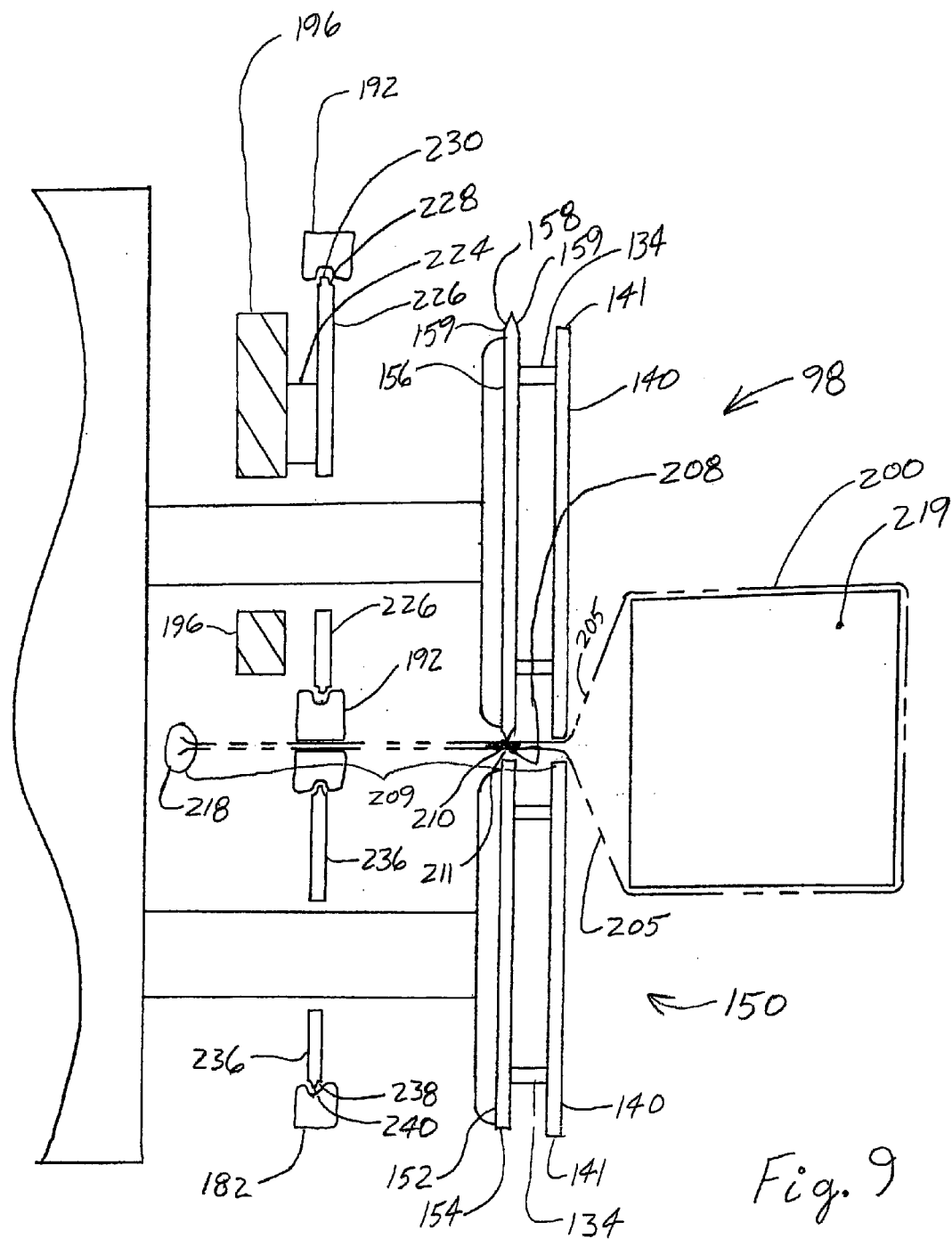
FIG. 9 is a cross-sectional view taken along line C—C of FIG. 7.
Figure 10:
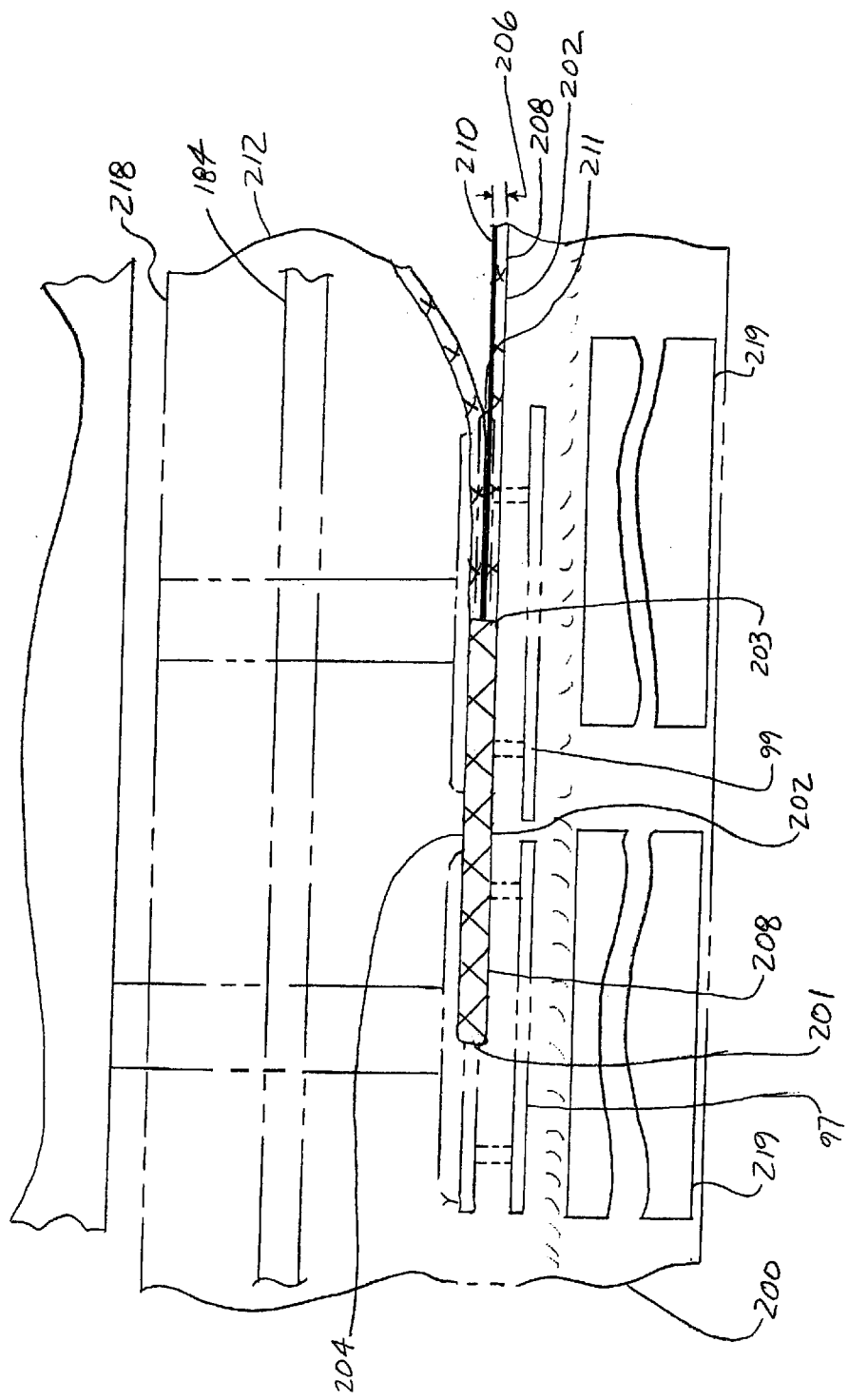
FIG. 10 is a partial plan view of the rollers engaging the film material taken along region D—D of FIG. 7.

Referring to FIGS. 3, 7, 9 and 10, lower second roller 150 is now be discussed. Lower second roller 150 which is adjacent lower first roller 110 is of essentially identical structure as lower first roller 110. The difference between lower second roller 150 and lower first roller 110 is an anvil ring 152, while having a flat peripheral surface 154 similar to that of sealing ring 128, their purposes for use with cutting and sealing apparatus 10 are different. Referring back to FIG. 8, lower first roller 110 working in opposition with upper first roller 96 apply a longitudinal side seal 208, also referred to as a side seal, having an inside edge 202 and an outside edge 204 to opposing surfaces 205 of film material 200 beginning at relative point of tangency 201 between the surface peripheries of first roller pair 97. Preferably, the width of side seal 208 is approximately 3/16 of an inch. Upper second roller 98 is likewise of virtually identical construction to that of lower second roller 150 with the exception of cutting ring 156 which forms a cutting periphery 158 by a pair of beveled edges 159 that preferably form an included angle therebetween ranging between approximately 60 to 70 degrees. Lower second roller 150 includes an anvil ring 152 having a flat peripheral surface 154 for engaging cutting periphery 158 of upper second roller 98. Referring to FIGS. 9 and 10, lower second roller 150 working in opposition with upper second roller 98 at relative point of tangency 203 therebetween forms a cutting path 211 along overlapping layers 209 terminating with opposing edges 218. Cutting path 211 is formed along an operator-adjustable margin 206 from inside edge 202 of side seal 208. Cutting path 211 may remove a portion, preferably approximately one-half of side seal 208, which minimizes loose film material 200 without compromising the strength of side seal 208 although the operator may leave seal 208 intact. Further, if the operator chooses to apply heat to either of the peripheral surfaces of second roller pair 99, a trim seal 210 may be formed along the edge of cutting path 211 which forms a head along edge of cutting path 211. Trim seal 210 acts to reinforce side seal 208, but more importantly, the application of heat eases the cutting of film material 200 because film material 200 is still soft from being heated by first roller pair 97.

The roller arrangement of the present invention overcomes problems in the art associated with the toughness of newer shrink-wrap film materials which require increased thermal energy be applied to establish the side seal. Conventional materials, requiring less thermal energy, were amenable to a combined sealing and trimming operation from a single pair of rollers. However, these newer materials which require elevated amounts of thermal energy to form side seals which are desirable because of their greatly increased strength, render the conventional approach of a single roller pair impracticable. Because thermal energy between roller pairs rolling in opposition to each other conduct thermal energy to opposing layers of shrink-wrap material 200 that pass between the peripheries of the roller pair at the relative point of tangency between the roller pairs, a single roller pair is incapable of transferring sufficient thermal energy to shrink-wrap material passing therebetween without greatly slowing the feed rate of film material 200 through cutting and sealing apparatus 10. Although a single roller pair configuration that simultaneously cuts and seals opposing layers of film material 200 passing therebetween may work reasonably well with conventional film materials, due to the constraints previously described, only a trim seal is capable of formation, which is a much weaker seal, and therefore less desirable. Additionally, the weaker seal is provided at a lower operational speed.

Referring to FIGS. 1–3, the drive system by which the shrink-wrap machine provides power to cutting and sealing apparatus 10 is now described. Extending upwardly from its driving connection with the shrink-wrap machine, first drive chain 160 both enters and exits body 12 of cutting and sealing apparatus 10 through longitudinal slot 24. First drive chain 160 meshes with gear 63 which is securely connected to shaft 58 that is connected to lower roller 64 of pulling device 52. First drive chain 160 proceeds in a longitudinal direction before wrapping around and meshing with gear 63 which is securely connected to hollow shaft 90 that is connected to lower first roller 110. First drive chain 160 exits box 12 through longitudinal slot 24 to engage the shrink-wrap machine driving mechanism (not shown) which provides driving power to first drive chain 160. An additional gear 63 (not shown), located adjacent gear 63 which is securely connected to shaft 90 that is connected to lower first roller 110, meshes with a second drive chain 162.

Second drive chain 162 proceeds longitudinally along cutting and sealing apparatus 10 passing over and engaging with gear 63 which is likewise securely connected to hollow shaft 90 that is securely connected to lower second roller 150. Interposed between gears 63 that are secured to shaft 90 which are securely connected to lower first roller 110 and lower second roller 150, respectively, is a retaining gear 166 which is rotateably carried by shaft 164 to maintain engagement of second drive chain 162 with gears 63. Further extending longitudinally along cutting and sealing apparatus 10, second drive chain 162 wraps around and engages with gear 168 which is securely connected to a lower aft shaft 170 which has a proximal end 172 and a distal end 174. Securely connected to distal end 174 is a drive gear 176, and securely connected to proximal end 172 is a second drive gear 180. Lower aft shaft 170 is rotatably carried in bearings 178 which are securely connected in transverse alignment with proximal plate 26 and distal plate 28, with second drive gear 180 extending outwardly from proximal plate 26 through an aperture 177. Thus, second drive chain 162 is in direct engagement with and directly drives lower first roller 110, lower second roller 150, and second drive gear 180. Second drive gear 180 meshes with and thereby drives a lower guide chain 182. Additionally, second drive chain 162 indirectly drives a shaft 188.

Shaft 188 includes a proximal end 189 which is securely connected to a gear 190 which meshes with and thereby drives upper guide chain 192, and a distal end 191 that is securely connected to drives gear 186. Drive gear 186 meshes with drive gear 176 which drive gears 180 and 190, respectively, in identical opposing rotational directions. In summary, first drive chain 160 and second drive chain 162 impart rotational movement of lower roller 64, lower first roller 110, lower second roller 150, lower guide chain 182 and upper guide chain 192 at a substantially identical speed along their respective peripheries with respect to one another along a film material path 245. The remaining rollers, i.e., upper roller 50, upper first roller 96, and upper second roller 98 likewise are maintained in synchronous rotation as followers with their respective rollers.

Referring to FIGS. 1–3 and 5–7, lower guide chain 182 and upper guide chain 192 which collectively comprise a guide chain pair 184 shall now be discussed. Guide chain pair 184 receives film material 200 sequentially from adjacent pulling device 52 and subsequently secures and guides overlapping layers 209 of film material 200 as opposing layers 209 are engaged with adjacent first roller pair 97 and adjacent second roller pair 99. Second roller pair 99 ultimately seals and cuts through overlapping layers 209 yielding a flap 212 which is separated and removed from the film-wrapped articles 219 as they proceed along the machine for subsequent separation between adjacent articles 219 which ultimately become individually-wrapped packages. Providing power to drive lower guide chain 182, as previously described, second drive gear 180 engages and drives lower guide chain 182. Lower guide chain 182 proceeds longitudinally before wrapping around lower gear 232. Interposed between second drive gear 180 and lower gear 232 in substantial alignment therewith, is lower guide 236 which is offset from proximal plate 26 by a pair of bosses 234 (not shown). Lower guide 236 engages lower guide chain 182 along opposing sides of its peripheral surface 238. Peripheral surface 238 provides a raised region 240 extending outwardly from peripheral surface 238 to maintain engagement with lower guide chain 182.

Upper guide chain 192 which shares a segment 242 of a common path with lower guide chain 182, is driven by gear 190. Upper guide chain 192 proceeds longitudinally until wrapping around upper gear 194. Similarly to lower guide 236, an upper guide 226 is interposed between gear 190 and upper gear 194 which is secured to an arm 196 at a predetermined spacing therefrom by a pair of bosses 224. Upper guide 226 has a peripheral surface 228 which engages upper guide chain 192 along opposing sides of upper guide 226. Peripheral surface 228 further includes a raised region 230 extending outwardly from peripheral surface 228 to maintain engagement with upper guide chain 192. Formed in upper guide 226 and in arm 196 are a pair of transversely aligned slotted apertures 227 and 222, respectively, which are provided for ample clearance with shafts 90 that drive upper first roller 96 and upper second roller 98. Slotted apertures 222 and 227 insure there is ample clearance for collectively rotating arm 196 and upper guide 226 about shaft 188. Arm 196 includes an aperture 198 in which a bearing 199 is fit, bearing 199 being rotatably carried along shaft 188. As is specifically shown on FIG. 5, upper guide chain 192 and lower guide chain 182 define segment 242 which is a common path between the two guide chains. However, referring to FIG. 6, an operator may grasp, for example, upper gear 194 and lift upwardly thereby pivoting arm 196 and upper guide 226 about shaft 188, which is illustrated in phantom lines in FIG. 6. By releasing upper gear 194, arm 196 along with upper guide 226 returns to its operating position. Segment 242 which is the common path between upper and lower guide chains 192 and 182 requires no additional vertical forces directing the two opposing guide chains toward each other to establish sufficient frictional gripping force to perform its intended task, as the combined weight of arm 196, upper guide 226, bosses 224 and upper guide chain 192 provide sufficient weight to establish such gripping force as is necessary.

Figure 5:
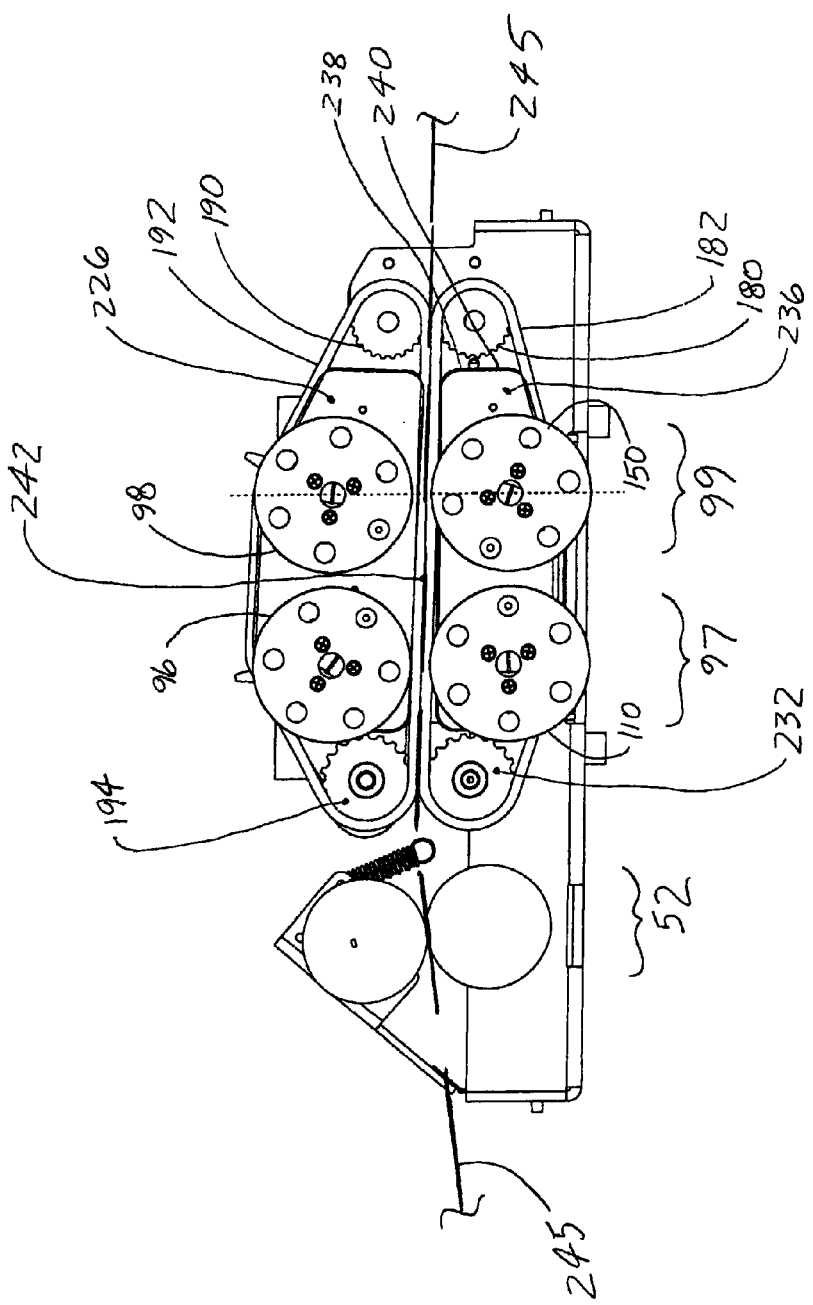
FIG. 5 is a side view of the apparatus.
Figure 6:
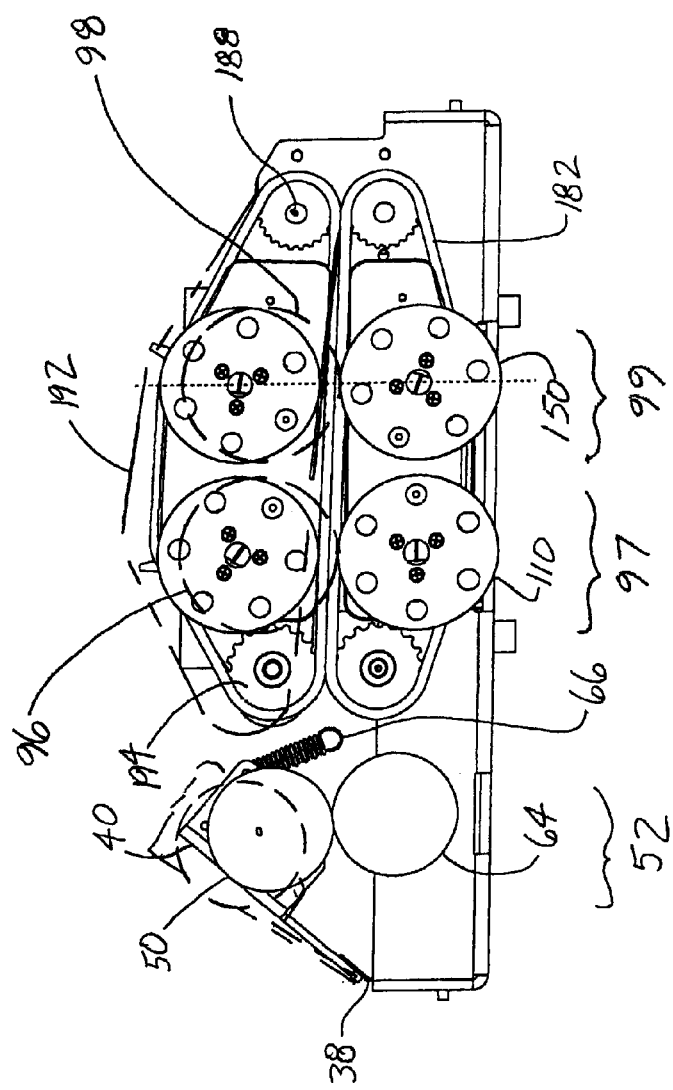
FIG. 6 is a side view illustrating range of motion of roller pairs and an upper guide chain.
Figure 7:
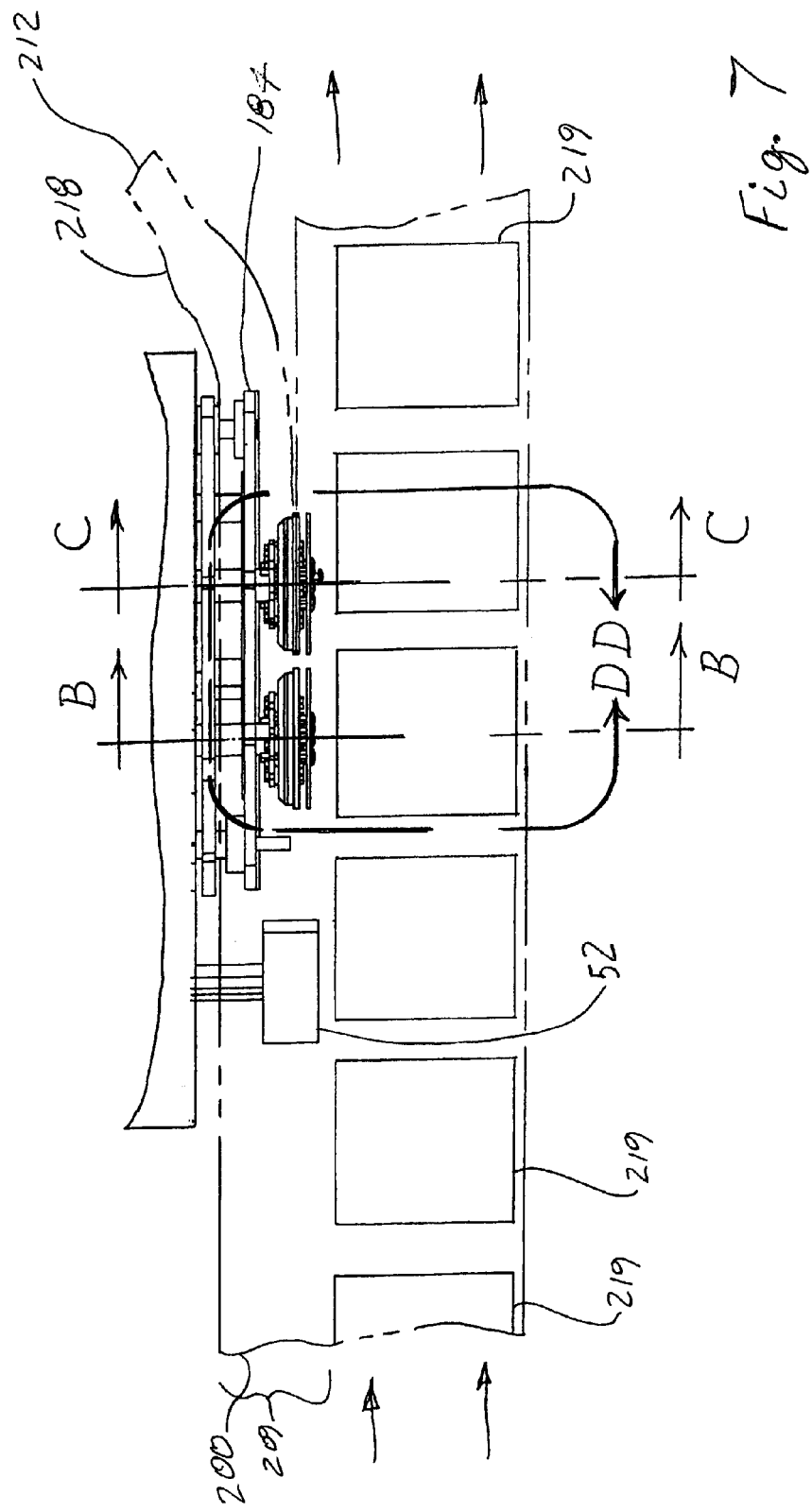
FIG. 7 is a partial plan view illustrating engagement with film-wrapped articles.

Referring to FIGS. 5 and 6, the ranges of motion of first roller pair 97, second roller pair 99 and upper guide chain 192 with respect to lower guide chain 182 shall now be discussed. As is shown in FIG. 6 in phantom lines, upper guide chain 192 may be rotated about shaft 188 to substantially separate upper guide chain 192 from lower guide chain 182, irrespective of whether the machine is on or off. Further, as previously discussed, both upper first roller 96 and upper second roller 98 are vertically movable along post 68 (FIG. 2). In normal operation, upper first roller 96 is directed toward lower first roller 110 by air cylinder 100 (FIG. 2) to apply a combination of heat and pressure to opposing sides of film layers 209 (not shown). Likewise, upper second roller 98 is directed toward lower second roller 150 by air cylinder 100 (FIG. 2) to apply pressure and heat, if the operator desires, to opposing overlapping layers 209. However, if the machine is on and conveying of film material is stopped, upper first roller 96 and upper second roller 98 are automatically directed in an upward vertical direction along post 68 (FIG. 2) away from lower first roller 110 and lower second roller 150, respectively, to avoid damaging that portion of overlapping layers 209 that are interposed between each of the respective roller pairs, because the combined effect of heat and pressure in a static situation would burn through overlapping layers 209. As is shown, as to upper roller 50 with respect to lower roller 64, upper roller 50 may be pivoted out of engagement with lower roller 64 by applying an upward force to support member 40 which pivots support member 40 about pin 38.

Referring to FIGS. 1–3 and 5–10, the operation of cutting and sealing apparatus 10 shall now be discussed. Initially, before the conveying device of the shrink-wrap machine is turned on which propels the combination of film-wrapped articles 219 toward cutting and sealing apparatus 10, upper first roller 96 and upper second roller 98 are maintained at a vertical distance from lower first roller 110 and lower second roller 150, respectively. Further, as previously discussed, overlapping layers 209 of film material 200 is interposed between upper guide chain 192 and lower guide chain 182 as is shown in FIGS. 8 and 9. Similarly, overlapping layers 209 are interposed between upper roller 50 and lower roller 64 by an operator (not shown) grasping support member 40 and applying a force in a vertical and a forward direction so that support member 40 which carries upper roller 50 are collectively rotated about the axis of pins 38, thereby separating upper roller 50 from lower roller 64. Upon the operator removing such vertically and forwardly directed forces, upper support member 40 carrying upper roller 50 is urged into its previous position by spring 66. Once the machine has been turned on, upper first roller 96, lower first roller 110, upper second roller 98 and lower second roller 150, which are all selectively heatable along their respective peripheral surfaces by heating elements 124, are allowed to reach their operating temperatures before commencing operation of the shrink-wrap machine. One having skill in the art will appreciate that the amount of heat that must be applied to each roller can vary, depending upon the thickness of film material 200 or the composition of film material 200. Additionally, the settings may be affected by the desired feed rate at which cutting and sealing apparatus 10 is to be operated.

Upon reaching the operating parameters, the operator commences operation of the shrink-wrap machine. Although not shown, articles 219 are first wrapped with shrink-wrap film material 200 from a film supply so that opposing edges of film material overlap creating overlapping layers 209 that extend to one side along articles 219. At this point film material 200 is not yet sealed. A conveyor means for carrying articles 219 wrapped in film material 200 from the wrapping station is conveyed to film ceiling and cutting station 10 at which film material is sealed and cut along one side of articles 219 before subsequent processing wherein transverse cutting and sealing operations are performed to produce individually-wrapped articles.

Once conveying device conveys film-wrapped articles 219 toward cutting and sealing apparatus 10 overlapping layers 209 are contacted on opposing sides 205 by upper roller 50 on one side and lower roller 64 on the opposite side of overlapping layers 209. First drive chain 160 which is powered by the shrink-wrap machine engages gear 63 that is securely connected to shaft 58 which imparts rotational movement of lower roller 64 about shaft 58. Upper roller 50 which is carried by support member 40 is urged toward lower roller 64 about the axis defined by pins 38 so that upper roller 50 rotates in a direction opposite that of lower roller 64 about shaft 48, thus pulling overlapping layers 209 in a direction toward first roller pair 97.

Before the shrink-wrap machine has been turned on, and before first roller pair 97 and second roller pair 99 have reached operating temperature, and before the conveyor device begins conveying film-wrapped articles 219 past cutting and sealing apparatus 10, an advanced portion of empty overlapped film material 200 is provided along apparatus 10. That is, this leading extension of film material 200 that is overlapped is directed between upper and lower rollers 50 and 64 and continually directed between upper guide chain 192 and lower guide chain 182 and additionally between upper first roller 96 and lower first roller 110 of first roller pair 97 and also between upper second roller 98 and lower second roller 150 of second roller pair 99.

While the machine is off or in a static condition as to film material 200 moving along it, as previously discussed, the shrink-wrap machine automatically separates and maintains a vertical separation between the opposing rollers of each roller pair. This separation is effected by air cylinder 100 pushing upwardly against flange 85 of vertical stroke block 74 from which extend a pair of flanges 84 which rotatably carry shafts 90 therein which drive first and second upper rollers 96 and 98. Vertical stroke block 74 is urged in a vertical direction along posts 68 which slidably engage vertical stroke block 74 to move upper first roller 96 in an upward vertical direction. An additional vertical stroke block 74 is similarly utilized to move upper second roller 98 in an upward vertical direction. Therefore, with the machine in idle or an off condition, upper first roller 96 and upper second roller 98 are separated from lower first roller 110 and lower second roller 150, respectively. To thread material between lower guide chain 182 and upper guide chain 192 merely requires the operator to grasp upper gear 194 and apply a vertical force thereto, which causes arm 196 which securely connects to upper guide 226 to collectively rotate arm 196, upper guide 226 and upper guide chain 192 about the axis of shaft 188. After the operator has directed overlapping layers 209 between guide chain pair 184, the operator may release upper gear 194 which will return to its original position.

Once the shrink-wrap machine is turned on and placed in a working mode, in addition to urging upper roller 50 and lower roller 64 of pulling device 52 into opposing rotational motion by first drive chain 160, first drive chain 160 further extends longitudinally until wrapping around gear 63 which is securely connected to hollow shaft 90 that is connected to lower first roller 110. Additionally secured adjacent gear 63 of shaft 90 is an additional gear 63 for engaging second drive chain 162 which additionally engages gear 63 of hollow shaft 90 that drives lower second roller 150 and finally engagingly wraps around gear 168 which is securely connected to lower aft shaft 170 which drives second drive gear 180. Second drive gear 180 engages and drives lower guide chain 182 which engagingly wraps around lower gear 232. Additionally securely connected to lower aft shaft 170 is drive gear 160 which meshes with drive gear 186 thereby imparting opposing rotational motion about shaft 188 which is securely connected to drive gear 186. Further, shaft 188 additionally drives gear 190 which engages upper guide chain 192. Upper guide chain 192 extends longitudinally and engagingly wraps around upper gear 194. Therefore, upper guide chain 192 and lower guide chain 182 are driven in opposing directions so that segment 242 defines a common path for unison of travel between upper guide chain 192 and lower guide chain 182 which is used to guide and direct overlapping layers 209. In summary, film path 245 is provided along which pulling device 52, guide chain pair 184, first roller pair 97 and second roller pair 99 all move at the same peripheral surface speed with respect to each other for effectively guiding overlapping layers 209 therethrough.

Referring to FIGS. 7–10, the ceiling and cutting operations of first roller pair 96 and second roller pair 99 shall now be discussed. As overlapping layers 209 proceed along film path 245 and after passing between the peripheral surfaces of pulling device 52, overlapping layers 209 are engaged between upper guide chain 192 and lower guide chain 182 along segment 242 which defines a common path between the opposing guide chains. While proceeding longitudinally along between guide chain pair 184, overlapping layers 209 engage first roller pair 97 as overlapping layers 209 are brought into relative tangential contact between opposing peripheral surfaces 129 of lower first layer 110 and upper first roller 96. A side seal 208 is formed between opposing surfaces 205 of overlapping layers 209 due to the heat and pressure applied from peripheral surfaces 129 of opposing sealing rings 128. Simultaneously, film clamps 140 are each maintained in coaxial alignment with sealing ring 128 of upper first roller 96 and with sealing ring 128 of lower first roller 110. Both film clamps 140 are transversely offset from their corresponding sealing ring 128 by a plurality of stand-off screws 134, which act to draw opposing surfaces 205 of overlapping layers 209 in close proximity therewith to improve the quality of lap seal 208, saving film material 200 due to the close proximity between film clamps 140 and their respective sealing rings 128.

While still proceeding between guide chain pair 184, overlapping layers 209 after engaging first roller pair 97 are subsequently engaged by adjacent second roller pair 99. Upon overlapping layer 209 reaching relative tangential contact between upper second roller 98 and lower second roller 150, cutting ring 156 of upper second roller, which has a pair of beveled edges 159 that form cutting periphery 158, contact and cut through overlapping layers 209 along cutting path 211 thereby forming trim seal 210 therealong if the operator chooses. The operator, by choosing to apply heat to second roller pair 99, may establish trim seal 210 which essentially consists of a bead formed along cutting path 211 that may supplement side seal 208 previously formed. An additional benefit to heating second roller pair 99 is that this permits opposing layers 209 of film material 200 to be more easily cut. Further, the operator may choose to trim a portion of lap seal 208, preferably bifurcating the original lap seal 208 in half, to provide less loose material without compromising the strength of the remaining seal, although the operator may choose to leave side seal 208 intact. After overlapping layers 209 have engaged second roller pair 99, forming a flap 212 which is separable from film-wrapped articles 219, flap 212 is separated and discarded, permitting film-wrapped articles 219 to further proceed longitudinally along the shrink-wrap machine for subsequent transverse cutting between adjacent articles 219 to eventually become individually wrapped packages.

One skilled in the art can appreciate that cutting and sealing apparatus 10 may be adjustably mounted on shrink-wrap machine to accommodate overlapping layers 209 that may be presented from different vertical positions, horizontal positions, or even angled positions.

As a further and still higher-speed and still more effective second embodiment for providing sealing and cutting of the new tough film materials, the film sealing and cutting apparatus comprises multiple pairs of selectively heated rollers, there being at least a heating roller pair and a seal-forming roller pair downstream of the heating roller pair. The heating roller pair is oriented so that overlapped layers of film material wrapped around an article are passed on one side of the article between peripheral surfaces of the heating roller pair to form a thermal conditioning pre-seal, i.e., a quasi-seal or preliminary or temporary seal, between opposing surfaces of the overlapping layers by application of heat and pressure along the peripheral surfaces of the heating roller pair. The apparatus comprises also a sealing roller pair to convert the pre-seal into a full seal of sealed opposing surfaces. Preferably, opposed rollers serve as means for cutting through the sealed opposing surfaces to leave a seal margin. Most preferably, the sealing roller pair provides roller periphery for both converting the pre-seal into a side seal and for also cutting through the sealed opposing surfaces.

The heating roller pair may be that of multiple such pairs of heating roller pairs for staged pre-heating of the film material, such that the tough film material is heated in stages.

As in the first embodiment described at least one pair of traction rollers may be position upstream of the first of heating roller pairs, and so also traction roller pairs may be located downstream of the seal-forming roller pair.

So also as in the first embodiment, the second embodiment includes pressure-producing structure to urge the respective roller pairs in opposition toward each other.

As a further possible modification, the cutting function may be provided, as in the first embodiment, by a roller pair downstream from the seal-forming roller pair.

In view of the foregoing description of the present invention and various embodiments, it will be seen that the several objects of the invention are achieved and other advantages are attained.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. For use with a shrink-wrap machine for individually wrapping articles sequentially with shrink-wrap film material of different possible thickness and composition, the shrink-wrap machine including a wrapping station at which articles are first wrapped with shrink-wrap film material from a film supply so that opposing edges of the film material overlap and extend to one side along the articles, but the film material is not yet sealed, and conveyor means for carrying articles wrapped in the film material from the wrapping station to a film sealing and cutting station at which the film material is sealed and cut along one side of the articles as they move with respect to the film sealing and cutting station, the improvement comprising a film sealing and cutting apparatus for use at the film sealing and cutting station, characterized by the film sealing and cutting apparatus comprising:

at least a first and a second pair of rollers, the first pair of rollers being in opposition positioned to one side of the articles for receiving between them overlapped layers of film material to present peripheral surfaces of the rollers of the first pair in opposition for forming a seal between opposing surfaces of the film material along longitudinal edges thereof between the rollers of the first pair, the seal having an inside edge and an outside edge, pressure-producing structure urging the rollers of the first pair in opposition toward each other, a heater heating at least one of the rollers of the first pair, to form by heat and pressure between the peripheral surfaces of the rollers of the first pair a longitudinal seal along a side of each article, as film-wrapped articles pass by the first pair of rollers, the second pair of rollers being in opposition positioned to one side of the articles for receiving between them overlapped layers of film material in proximity to the first pair of rollers for engagement of the film material proximate the seal after formation thereof, at least one of the rollers of the second pair having a cutting periphery, pressure-producing structure urging the rollers of the second pair in opposition toward each other, to cut by pressure applied to peripheral surfaces of the second pair of rollers through opposing surfaces of the sealed film material along the film material leaving a margin between a cutting path formed by the peripheral surfaces of the second pair of rollers and the inside edge of the seal.

2. Apparatus according to claim 1 further comprising a heater selectively heating at least one of the rollers of the second roller pair so that film material of increased thickness or different composition may be cut while substantially maintaining high feed rates of the machine.

3. Apparatus according to claim 1 wherein at least one of the first or second roller pairs further comprises a coaxial film clamp rotatably carried by each roller at a predetermined distance therefrom.

4. Apparatus according to claim 1 wherein the cutting path is formed while the film material is still soft from being heated by first roller pair.

5. Apparatus according to claim 1 wherein each roller of the at least first and second roller pairs being selectively heatable along the peripheral surface.

6. Apparatus according to claim 1 wherein each of the rollers of the first roller pair including a substantially flat peripheral surface for forming the seal between the opposing surfaces.

7. Apparatus according to claim 1 wherein the cutting periphery of the at least one roller of the second pair defines an included angle substantially between 60 and 70 degrees.

8. Apparatus according to claim 1 further comprising a pulling device adjacent the first roller pair for presenting the film material thereto.

9. Apparatus according to claim 1 wherein the margin is of adjustable length.

10. Apparatus according to claim 1 wherein the cutting path bifurcates the seal.

11. Apparatus according to claim 1 wherein the margin between the inside edge of the seal and the cutting path is such that the seal remains intact.

12. Apparatus according to claim 1 wherein only one of the rollers of each roller pair is driven by the machine.

13. Apparatus according to claim 1 further comprising a pair of guide chains in opposition interposed between the roller pairs and the opposing edges of film material, a segment of a common path of the guide chains moving in unison with each other for guiding the opposing edges of the film material therebetween along the film sealing and cutting apparatus.

14. Apparatus according to claim 1 wherein the sealing apparatus being vertically moveable to accommodate possibly different vertical positions of opposing edges of film material.

15. Apparatus according to claim 1 wherein the sealing apparatus configurable to engage opposing edges of film material extending horizontally to one side along the articles.

16. Apparatus according to claim 1 wherein the sealing apparatus configurable to engage opposing edges of film material extending vertically to one side along the articles.

17. Apparatus according to claim 1 wherein the at least second roller pair, when selectively heated, for simultaneously cutting through and forming a second seal between the opposing surfaces of film material, the second seal formed along the cutting path formed by the peripheral surface of the second roller pair.

18. Apparatus according to claim 3 wherein each film clamp is of substantially similar profile and size as the roller used therewith.

19. Apparatus according to claim 3 wherein the predetermined distance between each film clamp and roller is maintained by a plurality of standoffs.

20. Apparatus according to claim 3 wherein pressure-producing structure may selectively separate one roller of at least one of the roller pairs from the other roller.

21. Apparatus according to claim 8 wherein pulling device comprises a pair of opposing rollers.

22. Apparatus according to claim 13 wherein one of the pair of guide chains in opposition is moveable as to the other guide chain so that a substantial portion of the segment of one of the guide chains that move in unison may be selectively separated from each other.

23. Apparatus according to claim 17 wherein the second seal is a trim seal.

24. Apparatus according to claim 20 wherein pressure-producing structure is at least one air cylinder.

25. For use with a shrink-wrap machine for individually wrapping articles sequentially with shrink-wrap film material of different possible thickness and composition, the shrink-wrap machine including a wrapping station at which articles are first wrapped with shrink-wrap film material from a film supply so that opposing edges of the film material overlap and extend to one side along the articles, but the film material is not yet sealed, and conveyor means for carrying articles wrapped in the film material from the wrapping station to a film sealing and cutting station at which the film material is sealed and cut along one side of the articles as they move with respect to the film sealing and cutting station, the improvement comprising a film sealing and cutting apparatus comprising multiple pairs of selectively heated rollers, including at least a heating roller pair and a seal-forming roller pair, the heating roller pair being oriented so that overlapped layers of film material wrapped around an article are passed on one side of the article between peripheral surfaces of the heating roller pair to form a thermal conditioning pre-seal between opposing surfaces of the overlapping layers by application of heat and pressure along the peripheral surfaces of the heating roller pair, at least a sealing roller pair to convert the pre-seal into a side seal of sealed opposing surfaces, and means for cutting through the sealed opposing surfaces to leave a seal margin.

26. Apparatus as set forth in claim 25, wherein the sealing roller pair constitutes said means for cutting through the sealed opposing surfaces.

27. Apparatus as set forth in claim 26, wherein the sealing roller pair includes a roller periphery for both converting the pre-seal into a side seal and for also cutting through the sealed opposing surfaces.

28. Apparatus as set forth in claim 26, further comprising pressure-producing structure to urge the respective roller pairs in opposition toward each other.

29. For use with a shrink-wrap machine for individually wrapping articles sequentially with shrink-wrap film material of different possible thickness and composition, the shrink-wrap machine including a wrapping station at which articles are first wrapped with shrink-wrap film material from a film supply so that opposing edges of the film material overlap and extend to one side along the articles, but the film material is not yet sealed, and conveyor means for carrying articles wrapped in the film material from the wrapping station to a film sealing and cutting station at which the film material is sealed and cut along one side of the articles as they move with respect to the film sealing and cutting station, the improvement comprising a film sealing and cutting apparatus for use at the film sealing and cutting station, characterized by the film sealing and cutting apparatus comprising:

at least a first and a second pair of rollers, the first pair of rollers being in opposition positioned to one side of the articles for receiving between them overlapped layers of film material to present peripheral surfaces of the rollers of the first pair in opposition for forming a seal between opposing surfaces of the film material along longitudinal edges thereof between the rollers of the first pair, the seal having an inside edge and an outside edge, pressure-producing structure urging the rollers of the first pair in opposition toward each other, a heater heating at least one of the rollers of the first pair, to form by heat and pressure between the peripheral surfaces of the rollers of the first pair a longitudinal seal along a side of each article, as film-wrapped articles pass by the first pair of rollers, each roller of the first pair of rollers carrying a film clamp coaxially at a predetermined distance therefrom for bringing the opposing surfaces of the film material into proximity along the seal, the second pair of rollers being in opposition positioned to one side of the articles for receiving between them overlapped layers of film material in proximity to the first pair of rollers for engagement of the film material proximate the seal after formation thereof, each roller of the second pair of rollers carrying a film clamp coaxially at a predetermined distance therefrom for bringing the opposing surfaces of the film material into proximity along the seal, a heater for selectively heating at least one of the rollers of the second pair, at least one of the rollers of the second pair having a cutting periphery, pressure-producing structure urging the rollers of the second pair in opposition toward each other, to cut by pressure or by pressure and heat applied to peripheral surfaces of the second pair of rollers through opposing surfaces of the sealed film material along the film material leaving a margin between a cutting path formed by the peripheral surfaces of the second pair of rollers and the inside edge of the seal, additionally forming a second seal along the cutting path when the second pair of rollers are heated along their peripheral surfaces.

* * * * *